United States Patent
Ou et al.

(10) Patent No.: US 8,041,855 B1
(45) Date of Patent: Oct. 18, 2011

(54) DUAL-BUS SYSTEM FOR COMMUNICATING WITH A PROCESSOR

(75) Inventors: Jingzhao Ou, Sunnyvale, CA (US); Chi Bun Chan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 242 days.

(21) Appl. No.: 12/360,764

(22) Filed: Jan. 27, 2009

(51) Int. Cl.
G06F 3/00 (2006.01)
G06F 13/28 (2006.01)
G06F 13/00 (2006.01)
G06F 13/36 (2006.01)

(52) U.S. Cl. .............. 710/35; 710/14; 710/27; 710/308
(58) Field of Classification Search .................. None
See application file for complete search history.

(56) References Cited

U.S. PATENT DOCUMENTS

| | | | | |
|---|---|---|---|---|
| 5,426,737 A * | 6/1995 | Jacobs | ............................. | 710/27 |
| 5,438,666 A * | 8/1995 | Craft et al. | ...................... | 710/22 |
| 6,052,744 A * | 4/2000 | Moriarty et al. | ................ | 710/27 |
| 6,981,073 B2 * | 12/2005 | Wang et al. | ..................... | 710/28 |
| 7,110,935 B1 | 9/2006 | Hwang et al. | | |
| 2003/0126413 A1 * | 7/2003 | El-Kik et al. | ................. | 712/225 |
| 2003/0200373 A1 * | 10/2003 | Kent | ............................. | 710/305 |
| 2008/0270668 A1 * | 10/2008 | Tiwari et al. | .................. | 710/308 |

OTHER PUBLICATIONS

Xilinx, Inc., "System Generator for DSP," Release 10.1.1, Chapter 2: Hardware/Software Co-Design, Apr. 2008, pp. 138-144, available from Xilinx, Inc., 2100 Logic Drive, San Jose, CA 95124.

* cited by examiner

*Primary Examiner* — Henry Tsai
*Assistant Examiner* — Kris Rhu
(74) *Attorney, Agent, or Firm* — Kevin T. Cuenot; LeRoy D. Maunu; Lois D. Cartier (57) ABSTRACT

A system for communicating with a processor within an integrated circuit can include a dual-bus adapter (115) coupled to the processor (105) through a first communication channel (110) and a second communication channel (120). The dual-bus adapter further can be coupled to a memory map interface (135) through which at least one peripheral device communicates with the processor. Single word operations can be exchanged between the processor and the dual-bus adapter through the first communication channel. Burst transfer operations can be performed by exchanging signaling information between the processor and the dual-bus adapter over the first communication channel and exchanging data words between the processor and the dual-bus adapter through the second communication channel.

20 Claims, 3 Drawing Sheets

DUAL-BUS SYSTEM FOR COMMUNICATING WITH A PROCESSOR

FIELD OF THE INVENTION

The embodiments disclosed herein relate to integrated circuit devices (ICs). More particularly, the embodiments relate to communicating with a processor embedded within a programmable IC using multiple buses.

BACKGROUND OF THE INVENTION

Programmable integrated circuit devices (programmable ICs) are a well-known type of integrated circuit that can be programmed to perform specified logic functions. One type of programmable IC, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Other types of programmable ICs can include complex programmable logic devices (CPLDs), programmable logic arrays (PLAs), and programmable array logic (PAL) devices. For all of these programmable IC, the functionality of the device can be controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs can be programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC," refers to these devices and further may encompass other devices that are only partially programmable. For example, one type of programmable IC can include a combination of hard-coded transistor logic and a programmable switch fabric that programmably interconnects the hard-coded transistor logic.

Since programmable ICs provide a robust platform upon which complex systems may be built, these devices have become widely used in system development. Such is the case whether one is prototyping a system or creating the end product for release. This is particularly true of programmable ICs that include embedded processors. Some programmable ICs include a "hard" processor that is implemented within the device with preconfigured circuitry. That is, the programmable IC includes physical, preconfigured circuitry implementing the processor. No programming of the programmable logic is required. In other cases, the programmable ICs may include a "soft" processor. A soft processor is one that is implemented using the programmable fabric of the programmable IC by loading the appropriate configuration data into the device.

Often, peripheral devices communicate with the embedded processor, whether a soft processor or a hard processor, through a shared bus. A shared bus refers to a bus over which a plurality of different devices or peripherals may communicate with the processor. In general, shared buses can support burst transfers of data. A "burst transfer operation" or "bursting data" refers to sending one memory address and either sending a plurality of data words to be written beginning at the memory address or reading a plurality of words beginning at the memory address.

Burst transfers of data between a processor and another device over a shared bus, however, typically require a significant amount of control signals to be exchanged. This exchange of control signals, also referred to as "handshaking," adds complexity to any device with which the processor communicates. This "complexity" translates into system overhead in several ways including, but not limited to, the amount of hardware necessary to implement the control signaling, the bandwidth required to support the control signaling, and the time necessary to process the control signals. The complexity of supporting bust transfers of data over a shared bus also extends to the processor. Any processor that is to support burst data transfers on a shared bus must include specialized instructions, or functionality, for performing that task.

SUMMARY OF THE INVENTION

The embodiments disclosed herein relate to integrated circuit devices (ICs) and, more particularly, to communicating with a processor embedded within an IC using multiple buses. One embodiment of the presenting invention can include a system for communicating with a processor within an IC. The system can include a dual-bus adapter coupled to the processor through a first communication channel and a second communication channel. The dual-bus adapter further can be coupled to a memory map interface through which at least one peripheral device communicates with the processor. Single word operations can be exchanged between the processor and the dual-bus adapter through the first communication channel. Burst transfer operations can be performed by exchanging signaling information between the processor and the dual-bus adapter over the first communication channel and exchanging data words between the processor and the dual-bus adapter through the second communication channel.

Responsive to detecting signaling information on the first communication channel, the dual-bus adapter can determine whether a burst transfer operation has been initiated according to a value stored within a burst register. The signaling information can specify a single word operation to be performed via the first communication channel. Accordingly, responsive to determining that a value greater than zero is stored within the burst register, the dual-bus adapter can determine that a burst transfer operation is to be performed in lieu of the single word operation.

The first communication channel can be implemented as a shared bus. The second communication channel can be implemented as a direct bus. The second communication channel can include a write first-in-first out (FIFO) memory transferring data words from the processor to the dual-bus adapter and a read FIFO memory transferring data words from the dual-bus adapter to the processor.

The dual-bus adapter can iteratively read a number of data words from the write FIFO memory and write the data words to a memory map interface. The number of data words can be determined according to a value stored in the burst register. For example, the dual-bus adapter, in an iterative manner, until the value stored in the burst register indicates no further data words to be burst transferred, can read a data word from the write FIFO memory, write the data word to an address in memory through the memory map interface, increment the address, and decrement the value stored in the burst register.

The dual-bus adapter can iteratively write a number of words from the memory map interface to the read FIFO memory corresponding to the value stored in the burst register. For example, the dual-bus adapter can iteratively, until the value stored in the burst register indicates no further data words to be burst transferred, read a data word at a selected memory address through the memory map interface, write the data word to the read FIFO memory, increment the address, and decrement the value stored in the burst register.

Another embodiment of the present invention can include a method of communicating with a processor within an IC. The method can include exchanging, through a first communication channel, signaling information specifying a single word operation between a processor and a dual-bus adapter and responsive to the singe word operation, determining whether a burst register indicates a burst transfer operation. When the burst register indicates no burst transfer operation to be performed, the single word operation can be performed over the first communication channel. When the burst register indicates that a burst transfer operation is to be performed, data words of the burst transfer operation can be exchanged between the processor and the dual-bus adapter through a second communication channel.

The method can include selecting the first communication channel to be a shared bus and selecting the second communication channel to be a direct bus. The second communication channel can include a FIFO memory that receives data words of a burst transfer operation from the processor. The burst register can indicate that a burst transfer operation is to be performed. Accordingly, the method can include, until the burst register indicates no further data words to be burst transferred, retrieving a data word from the FIFO memory, writing the data word to an address in memory through a memory map interface, incrementing the address, and decrementing the value stored in the burst register.

In another aspect, the second communication channel can include a FIFO memory that transmits data words of a burst transfer operation to the processor. The burst register can indicate that a burst transfer operation is to be performed. The method can include, until the burst register indicates no further data words to be burst transferred, reading a data word from an address in memory via the memory map interface, writing the data word to the FIFO memory, incrementing the address to be read through the memory map interface, and decrementing the value stored in the burst register.

Another embodiment of the present invention can include a computer program product including a computer-usable medium having computer-usable program code that implements a system for communicating with a processor within an IC. The computer-usable medium can include computer-usable program code that implements a dual-bus adapter coupled to the processor through a first communication channel and a second communication channel, wherein the dual-bus adapter is further coupled to a memory map interface through which at least one peripheral device communicates with the processor. The computer program product can include computer-usable program code that causes the dual-bus adapter to implement single word operations with the processor through the first communication channel and computer-usable program code that causes the dual-bus adapter to implement burst transfer operations by exchanging signaling information with the processor over the first communication channel and exchanging data words with the processor through the second communication channel.

The signaling information can specify a single word operation to be performed via the first communication channel. The computer-usable program code that implements a dual-bus adapter further can include computer-usable program code that implements the dual-bus adapter to, responsive to determining that a value greater than zero is stored within the burst register, determine that a burst transfer operation is to be performed in lieu of the single word operation.

The computer-usable medium also can include computer-usable program code that implements the first communication channel as a shared bus. The computer-usable medium also can include computer usable program code that implements the second communication channel as a direct interface having a write FIFO memory transferring data from the processor to the dual-bus adapter and a read FIFO memory transferring data from the dual-bus adapter to the processor.

The computer-usable program code that implements the dual-bus adapter further can include computer-usable program code that causes the dual-bus adapter to iteratively exchange a number of data words between the processor and a memory map interface through the second communication channel, wherein the number of data words is determined according to a value stored in the burst register.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed within this specification relate to communicating with a processor disposed within an integrated circuit device (programmable IC). In accordance with the inventive arrangements disclosed herein, an adapter is provided that interfaces with the processor. The adapter can support communication over a shared communication channel and a direct communication channel. In general, single word operations between the processor and the adapter can be performed over the shared communication channel while burst transfer operations can be performed using both communication channels.

As used within this specification, a "single word operation" can refer to either a single word write operation or a single word read operation. A "burst transfer operation" or "bursting data" can refer to sending one memory address and either sending a plurality of data words to be written beginning at the memory address or reading a plurality of words beginning at the memory address. A burst transfer operation can refer to a read type of burst transfer operation or a write type of burst transfer operation.

For example, when performing a burst transfer operation, signaling information can be exchanged between the processor and the adapter via the shared communication channel. The signaling information can specify a single word operation in a format that is native to the shared bus communication channel. The data words to be transferred as part of the burst transfer can be exchanged using the direct communication channel. This implementation avoids much of the control signal overhead required to implement a burst transfer operation via the shared communication channel. Further, the amount of circuitry required to implement the adapter portion of the system, which interfaces the processor with a memory map interface, can be significantly reduced as compared to the size of an adapter capable of performing a burst transfer operation via the shared communication channel alone.

Figure 1:
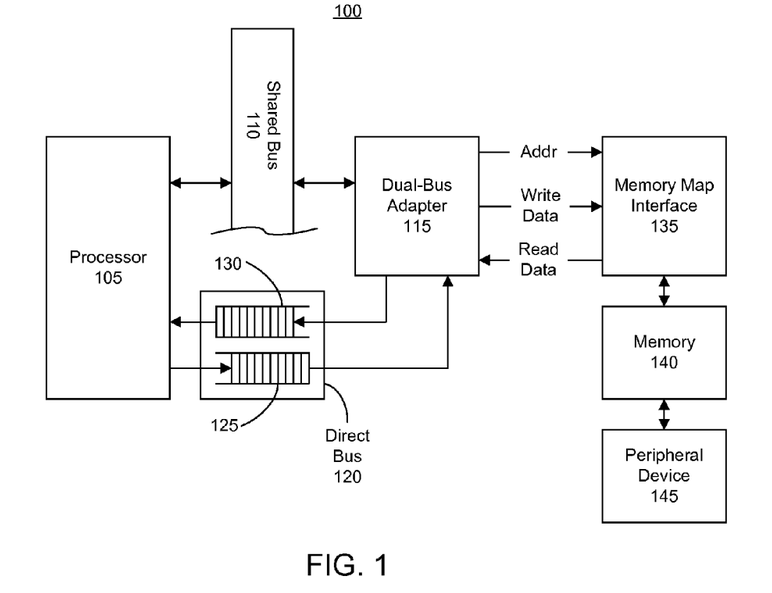
FIG. 1 is a block diagram illustrating a system for communicating with a processor in accordance with one embodiment of the present invention.

FIG. 1 is a block diagram illustrating a system 100 for communicating with a processor 105 in accordance with one embodiment of the present invention. System 100 can be implemented within a programmable IC. It should be appreciated that while the embodiments are described as being implemented within a programmable IC, the embodiments may be implemented within an IC that is not programmable. In this regard, the inventive arrangements disclosed within this specification are not limited to implementation within any particular type of IC. As pictured in FIG. 1, system 100 can include a processor 105, a dual-bus adapter 115, and a memory map interface 135. A memory 140 and one or more peripheral devices 145 also may be included.

In one aspect, processor 105 can be implemented as a hard processor that is embedded or disposed within the programmable IC. In another aspect, processor 105 can be implemented as a soft processor formed using the programmable logic available within the programmable IC. Processor 105 can be coupled to dual-bus adapter 115 via two different communication channels.

The first communication channel can be implemented as a shared bus 110. In general, shared bus 110 can be a communication channel through which three or more devices may communicate. For example, although not shown, one or more additional peripheral devices may be coupled to shared bus 110, and thus, to processor 105. In one embodiment, shared bus 110 can be implemented as a Processor Local Bus (PLB).

When implemented as a PLB, shared bus 110 can support read and write data transfers between master, in this case processor 105, and slave devices equipped with a shared bus interface, e.g., dual-bus adapter 115. Shared bus 110 can support multiple master and slave devices. Each master device can be attached to shared bus 110 through separate address, read-data, and write-data buses. Each slave device can be attached to shared bus 110 through shared, but decoupled, address, read-data, and write-data buses, as well as a plurality of transfer control and status signals for each data bus. Access to shared bus 110 can be granted through a central arbitration mechanism that allows masters to compete for bus ownership. The arbiters of shared bus 110 can be implemented, for example, within the programmable fabric of the programmable IC.

The second communication channel can be implemented as direct bus 120. Direct bus 120 can be a point-to-point connection between processor 105 and dual-bus adapter 115. In one embodiment, direct bus 120 can be implemented as a pair of Fast Simplex Link (FSL) buses. An FSL bus refers to a uni-directional point-to-point communication channel bus used to perform fast communication between any two design elements on the programmable IC. A pair of FSL buses can transfer data to and from the register file on processor 105 to dual-bus adapter 115.

Being a point-to-point connection, direct bus 120 will have no other devices on the bus other than processor 105 and dual-bus adapter 115. The limitation as to the number of devices on direct bus 120 means that the significant control signaling required, e.g., the "handshaking," to perform burst transfer operations on shared bus 110 is not required on direct bus 120.

It should be appreciated that the embodiments disclosed herein are not intended to be limited solely to a PLB type of shared bus or a FSL type of direct bus. The two bus types are provided for purposes of illustration only. Any type of bus that conforms with the description and/or behavior illustrated within this specification for the shared bus or the direct bus may be used.

Direct bus 120 can include a first memory 125, e.g., a write memory, and a second memory 130, e.g., a read memory. Each of memories 125 and 130 can be implemented as a first-in-first-out memory. Memory 125, as shown, can be dedicated to passing data from processor 105 to dual-bus adapter 115. Memory 130 can be dedicated to passing data from dual-bus adapter 115 to processor 105.

Dual-bus adapter 115 can be coupled to memory map interface 135 via one or more address wires, one or more write data wires, and one or more read data wires. Within this specification, the terms "signal," "wire," "connection," "terminal," and "pin" may be used interchangeably, from time-to-time, in reference to the wires that connect the various circuit modules described or the signals carried by these wires.

Memory map interface 135 is a circuit that provides address decoding between dual-bus interface 115 and memory 140. In one embodiment, memory map interface 135 can be implemented as one or more multiplexers that can selectively decode and access addresses of memory 140. Accordingly, memory map interface 135 can write data to memory 140 as well as read data from memory 140 based upon an address provided to memory map interface 135 via the address line. Data words to be written to memory 140 can be provided to memory map interface 135 via the write line. Data words to be retrieved or read from memory 140 by memory map interface 135 are provided to dual-bus adapter 115 via the read line.

Memory 140, though pictured as a single memory, may include a plurality of memories, each being individually addressable and each including one or more addressable memory locations. Within memory 140, for example, particular addresses can be mapped to particular signals, components, registers, or the like, of dual-bus adapter 115 and/or processor 105. Accordingly, the state of these circuit elements may be changed or functions of the circuit elements invoked by writing to the corresponding addresses in memory 140 via memory map interface 135.

Dual-bus adapter 115 facilitates communication between processor 105 and memory map interface 135 through shared bus 110, direct bus 120, or both. In cases where a single data word is to be exchanged between processor 105 and memory map interface 135 through dual-bus adapter 115, that single data word can be passed through shared bus 110. In cases where more than one data word is to be burst transferred, both shared bus 110 and direct bus 120 can be used to implement the burst transfer operation, whether to or from processor 105.

When performing a burst transfer operation, shared bus 110 can be used to exchange signaling information between processor 105 and dual-bus adapter 115. The data words to be transferred, however, can be exchanged between processor 105 and dual-bus adapter 115 through direct bus 120. For example, when processor 105 is to burst transfer data words to memory map interface 135, signaling information can be sent from processor 105 to dual-bus adapter 115 via shared bus 110. Processor 105, after indicating that write type of burst transfer operation is to be performed, can write the data words to be burst transferred to memory 125. Dual-bus adapter 115, after determining that a write type of burst transfer operation has been initiated or requested, can retrieve the data words from memory 125. Dual-bus adapter 115 can pass the data words read from memory 125 to memory map interface 135 with the corresponding address information. The initial address to be written can be specified in the signaling information passed through shared bus 110.

Similarly, when processor 105 is to initiate a read type of burst transfer operation to obtain data words from memory 140, signaling information can be sent from processor 105 to dual-bus adapter 115 via shared bus 110. The signaling information can specify the first address of memory 140 to be read. Processor 105 also can indicate that a read type of burst transfer operation is to be performed. Accordingly, dual-bus adapter 115 can read the data words to be burst transferred from memory 140 through memory map interface 135 starting at the memory address specified in the signaling information received over shared bus 110. Dual-bus adapter can write those data words to memory 130 of direct bus 120. Processor 105 then can retrieve the data words from memory 130. Since both of memories 125 and 130 are FIFO memories, data words can be rapidly read from or written to each respective memory 125 and/or 130 quickly and efficiently, with a minimum of control signaling.

As used within this specification, the term "data word" can be used to refer to a plurality of bits of data, as opposed to signaling information, that may be transferred through shared bus 110 or direct bus 120 as a single unit. While in some cases a word typically refers to a particular number of bits of data, within the examples illustrated in this specification, the particular length of each word, or number of bits of each word, may vary according to the implementation, e.g., width, of both shared bus 110 and direct bus 120.

Figure 2:
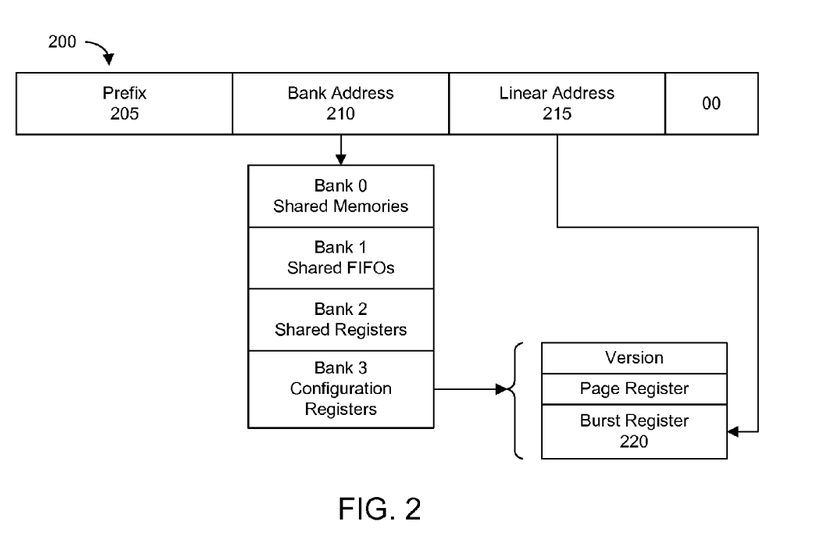
FIG. 2 is a block diagram illustrating memory utilized by the dual-bus adapter, described with reference to FIG. 1, in accordance with another embodiment of the present invention.

FIG. 2 is a block diagram illustrating memory utilized by the dual-bus adapter, described with reference to FIG. 1, in accordance with another embodiment of the present invention. FIG. 2 illustrates a portion of memory, referred to as the bus adapter control memory 200, that can be utilized by the dual-bus adapter, at least in part, to determine whether burst transfer operations have been requested by the processor and to track the progress of burst transfer operation. The bus adapter control memory 200 can be included within memory 140 illustrated with respect to FIG. 1. As such, the bus adapter control memory 200 may be accessible by the dual-bus adapter via the memory map interface. In another aspect, one or more portions of the bus adapter control memory 200 illustrated in FIG. 2 may be disposed within the dual-bus adapter, whether such memory is directly addressable by the dual-bus adapter or is addressable by the dual-bus adapter through the memory map interface.

As shown, bus adapter control memory 200 can include a prefix portion 205, a bank address portion 210, a linear address portion 215, and optionally one or more additional bits that may be reserved or used for other purposes. The reserved bits are denoted as "00." Prefix portion 205 can store a prefix value used to recognize whether an address that is broadcast over the shared bus relates to the peripheral device that is coupled to memory, and thus, the memory map interface. For example, referring to FIG. 1, prefix portion 210 can store a value corresponding to peripheral device 145 of FIG. 1. A control message from the processor can specify a prefix value that can be compared, by the dual-bus adapter, with the value in prefix portion 210 to determine whether a match exists. If so, the dual-bus adapter determines that the control message refers to peripheral device 145. Accordingly, the peripheral device can enter a ready state for either sending data to the processor or receiving data from the processor via the memory map interface.

Bank address portion 210 can store a value indicating which of several memory banks of the programmable IC a particular broadcast address refers. Bus adapter control message 210 may specify a bank, which may be stored in bank address portion 215. For example, within a programmable IC, the memory, referred to as memory 140 in FIG. 1, may be subdivided or organized into a plurality of banks. Bank 0, for example, can include shared memories. Shared memories may be implemented using one or more dual-port block random access memories (BRAM). The dual-port structure of a BRAM allows the BRAM to utilize one port for reading data and the other port for writing data, thereby implementing a memory capable of performing concurrent read and write operations.

Bank 1 can include one or more FIFO memories. The FIFO memories included within bank 1 can include one or more "from" FIFO memories and one or more "to" FIFO memories to provide bi-directional communication. Bank 2 can include one or more shared registers. Bank 3 can include one or more configuration registers. Bank 3 can store configuration information for the memory map, e.g., memory 140. For example, bank 3 can include register memory, denoted as the version register, that can store a version of the memory map implementation and register memory, denoted as the page register, that can store a reference to a particular page of the dual-port BRAM shared memory.

Bank 3 also can include register memory, denoted as burst register 220, that can store the number of data words to be burst transferred. Burst register 220 provides a mechanism through which the processor can initiate or indicate a burst transfer operation. In one embodiment, the processor can indicate a burst transfer by writing a value to the burst register 220 that is larger than zero. For example, the dual-bus adapter can be configured to check burst register 220 any time a single word operation is detected upon the shared bus. When the value of the burst register 220 is greater than zero, the dual-bus adapter, having received the signaling information indicating a single word operation, determines that a burst transfer has been requested by the processor. Burst register 220 can be adjusted, e.g., decremented, by the dual-bus adapter during the process of performing a burst transfer operation.

Linear address portion 215 can specify the particular address within the specified bank of memory to which data will be written or from which data will be read. Linear address portion 215 can be updated from time to time as will be described within the remaining figures during the course of a burst transfer operation.

Figure 3:
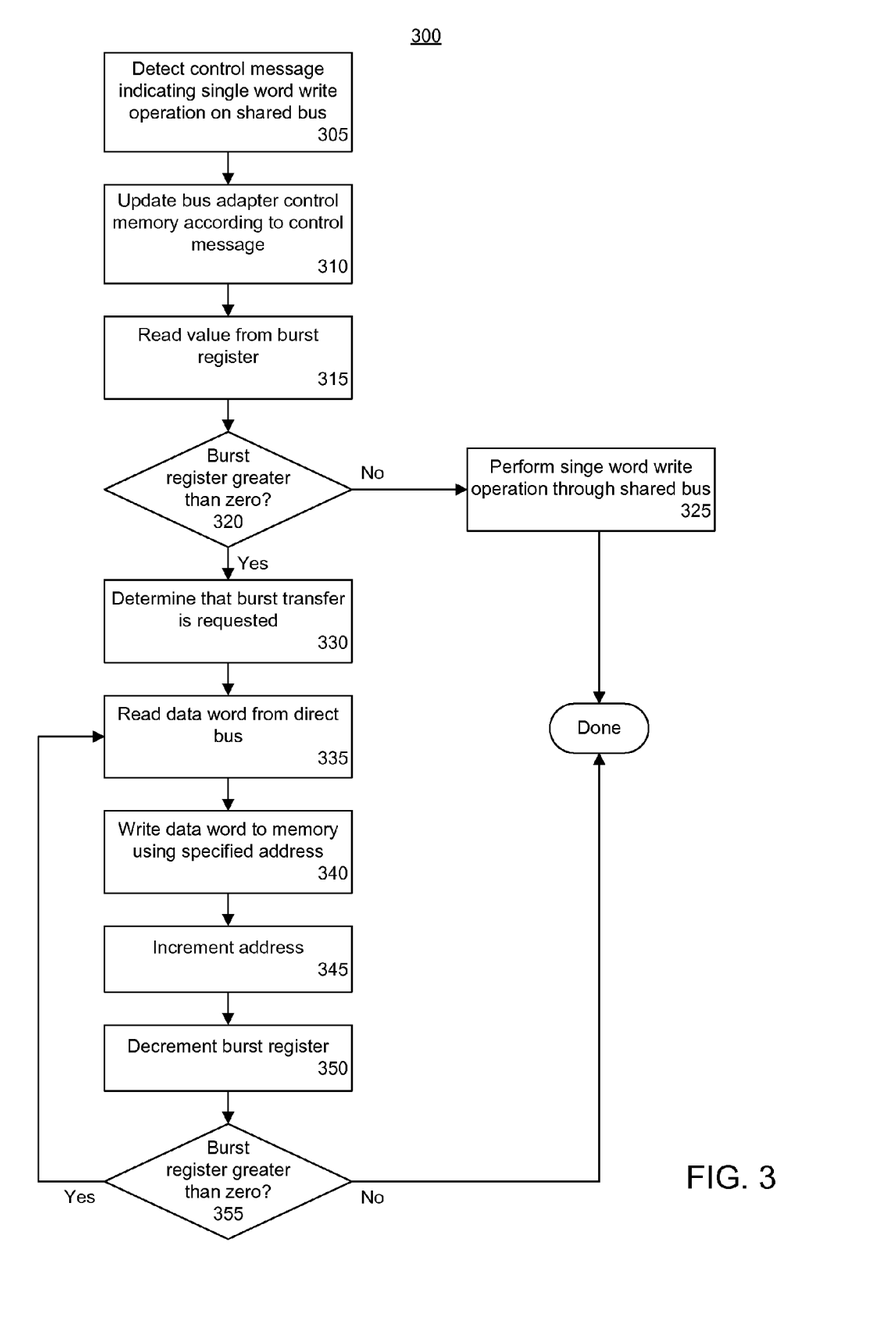
FIG. 3 is a flow chart illustrating a method of communicating with a processor disposed within a programmable IC in accordance with another embodiment of the present invention.

FIG. 3 is a flow chart illustrating a method 300 of communicating with a processor disposed within a programmable IC in accordance with another embodiment of the present invention. More particularly, FIG. 3 illustrates a method of performing a write type of burst transfer operation from the processor to the memory map interface in accordance with another embodiment of the present invention. Method 300 can be performed by the dual-bus adapter described within this specification with reference to FIGS. 1-2.

Method 300 can begin in step 305, where the dual-bus adapter can detect a control message indicating a single word write operation on the shared bus. The processor, for example, can send the control message over the shared bus to the dual-bus adapter. The control message can be specified in the native format used for sending signaling information on the shared bus. As such, there is nothing inherent to the control message that indicates anything other than a single word write operation. As noted, however, the processor may write a value larger than zero to the burst register in order to indicate that the operation to be performed is a write type of burst transfer operation. The value written to the burst register can be "N" where N is a positive integer specifying the total number of data words to be burst transferred from the processor to the memory map interface.

In step 310, responsive to receiving the control message, the dual-bus adapter can update the bus adapter control memory with the relevant data. For example, the control message can specify bank information, linear address information, e.g., an address, and the like. In one embodiment, the control message can specify a value to be used to update the burst register, though this value may also be written independently to the burst register by the processor. As noted, the bus adapter control memory may be updated directly by the dual-bus adapter or updated via the memory map interface.

In step 315, the dual-bus adapter can read the value stored in the burst register. The dual-bus adapter, responsive to detecting the single word write control message on the shared bus, can read the value stored in the burst register. In step 320, the dual-bus adapter can determine whether the value stored in the burst register is greater than zero. If so, the method can proceed to step 330. If not, the method can continue to step 325.

Continuing with step 325, since the value stored in the burst register is zero, the dual-bus adapter can determine that no burst transfer operation is requested by the processor. Accordingly, the processor will provide the single data word to the dual-bus adapter via the shared bus. The dual-bus adapter can obtain the single data word via the shared bus using the standard protocol observed on the shared bus and continue processing as in the case of a conventional single word write operation. The dual-bus adapter can provide the single data word to the memory map interface with the appropriate address, e.g., bank address and linear address, from the bus adapter control memory, thereby causing the data word to be written to the correct memory address within the programmable IC.

Proceeding with step 330, the dual-bus adapter can determine that the processor has requested a burst transfer operation. A burst transfer operation will be performed in lieu of a single word transfer operation. The dual-bus adapter can determine that the data words to be burst transferred will be sent from the processor via the direct bus. The processor, for example, can write, or will have written, each of the N data words to the FIFO memory within the direct bus that is dedicated to transferring data from the processor to the dual-bus adapter, e.g., the write FIFO memory.

In step 335, the dual-bus adapter can read a data word from the direct bus, e.g., the FIFO memory to which the processor has written the data words to be burst transferred. In step 340, the dual-bus adapter can write the data word to the memory using the address stored in the bus adapter control memory. In particular, the dual-bus adapter can pass the data word along with the address, e.g., both bank address and linear address, to the memory map interface. The memory map interface can decode the received address information and write the data word to the decoded address.

In step 345, the dual-bus adapter can increment the address. In particular, the dual-bus adapter can increment the linear address stored in the bus adapter control memory. In step 350, the dual-bus adapter can decrement the burst register, indicating one fewer data word to be burst transferred from the direct bus. In step 355, the dual-bus adapter can determine whether any further data words remain to be processed according to whether the burst register stores a value that is greater than zero. When no further data words remain to be processed, the method can end. When additional data words remain to be processed, the method can loop back to step 335, where the dual-bus adapter can read a next word from the direct bus to be provided to the memory map interface for writing. The next word will be written to the incremented address.

In this manner, each data word to be burst transferred can be send from the processor to the memory map through the direct bus. This implementation avoids the signaling that would be required to implement a burst transfer operation using the shared bus alone. The reduction in signaling also allows the dual-bus adapter to have a smaller footprint, e.g., be implemented with much fewer resources, than would be the case were bursting transfer operations supported on the shared bus. In other words, implementation of the dual-bus adapter in a manner that supports single word operations on the shared bus and burst transfers of data words through the direct bus requires fewer resources than does implementing a bus adapter that supports burst transfer operations on the shared bus. This means that the system described, which supports burst transfers, is much smaller than would be the case were burst transfer operations to be supported using only the shared bus.

By supporting single word operations, however, the dual-bus adapter is able to maintain compatibility with a large number of other systems or components. The shared bus, for example, can be implemented using a standardized bus signaling protocol. Thus, data can be efficiently burst transferred when necessary while maintaining the compatibility afforded by inclusion of the shared bus, e.g., for single word operations.

Another benefit of implementing burst transfer operations in the manner described is that a processor that does not include the instructions necessary for supporting burst transfer operations over a shared bus may still be burst transfer enabled. The processor, presuming the ability to communicate also through the direct bus, need only be programmed with the appropriate computer-usable program code to initiate a single word read or a single word write operation on the shared bus, e.g., generate and send a control message, and include additional computer-usable program code to write to the burst register when a burst transfer operation is desired.

Figure 4:
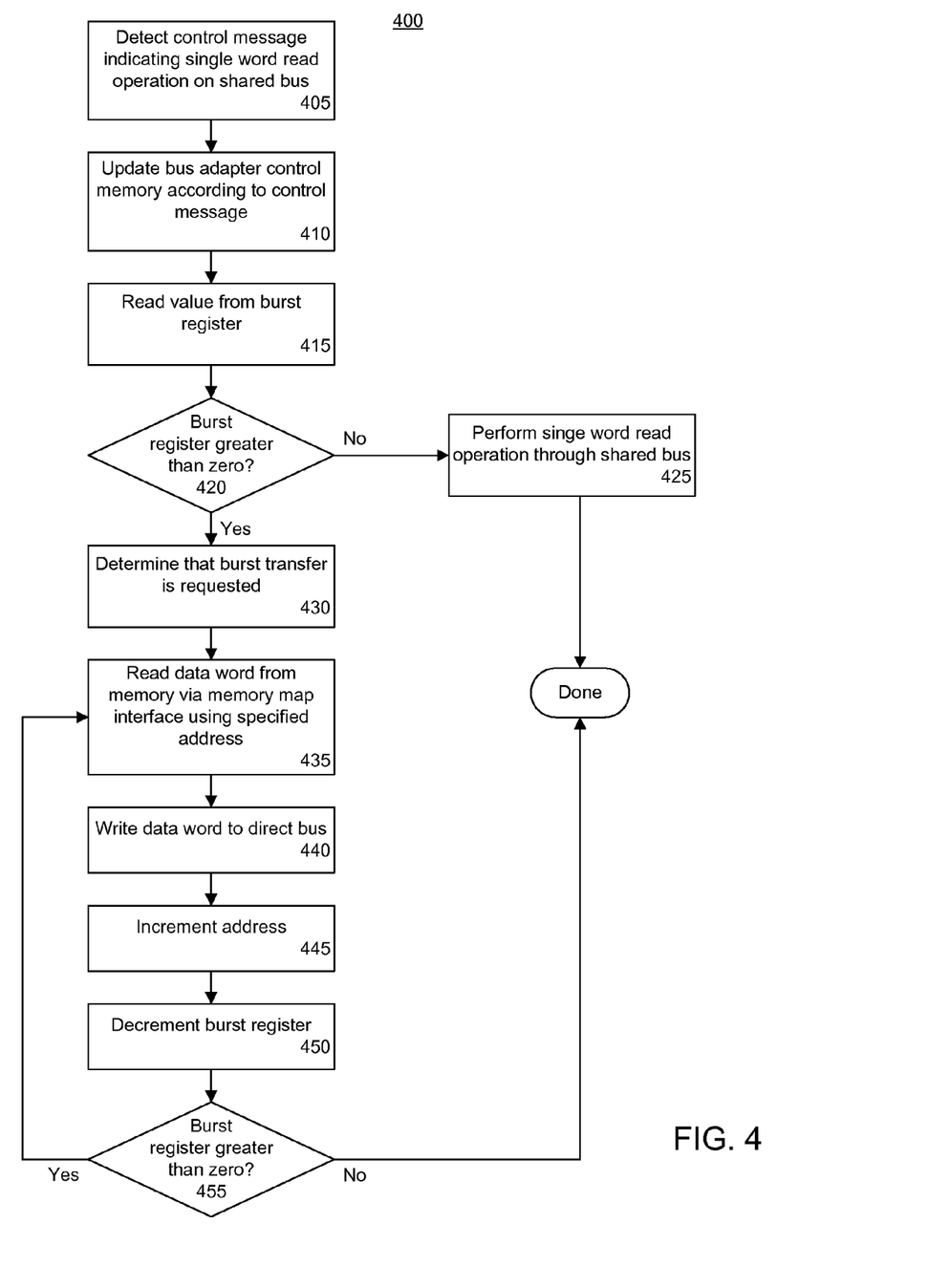
FIG. 4 is a flow chart illustrating a method of communicating with a processor disposed within a programmable IC in accordance with another embodiment of the present invention.

FIG. 4 is a flow chart illustrating a method 400 of communicating with a processor disposed within a programmable IC in accordance with another embodiment of the present invention. More particularly, FIG. 4 illustrates a method of performing a read type of burst transfer operation from the memory map interface to the processor in accordance with another embodiment of the present invention. Method 400 can be performed by the dual-bus adapter described within this specification with reference to FIGS. 1-3.

Method 400 can begin in step 405, where the dual-bus adapter can detect a control message indicating a single word read operation on the shared bus. The processor, for example, can send the control message over the shared bus to the dual-bus adapter. The control message can be specified in the native format used for sending signaling information on the shared bus. As such, there is nothing inherent to the control message that indicates anything other than a single word read operation. As noted, however, the processor may write a value larger than zero to the burst register in order to indicate that the operation to be performed is a read type of burst transfer operation. The value written to the burst register can be "N" where N is a positive integer specifying the total number of data words to be burst transferred from the memory map interface to the processor.

In step 410, responsive to receiving the control message, the dual-bus adapter can update the bus adapter control memory with the relevant data. As noted, the control message can specify address information in the form of a bank address and a linear address. The burst register may be written using any of the various techniques described.

In step 415, the dual-bus adapter can read the value stored in the burst register. The dual-bus adapter, responsive to detecting the single word read control message on the shared bus, can read the value stored in the burst register. In step 420, the dual-bus adapter can determine whether the value stored in the burst register is greater than zero. If so, the method can proceed to step 430. If not, the method can continue to step 425.

Continuing with step 425, since the value stored in the burst register is zero, the dual-bus adapter can determine that no burst transfer operation is requested by the processor. Accordingly, the dual-bus adapter can provide the processor with the single data word via the shared bus. The dual-bus adapter can initiate a read operation of a data word from the address specified in the control information via the memory map interface. Responsive to receiving that data word from the memory map interface, the dual-bus adapter can pass that data word to the processor via the shared bus using the standard protocol observed on the shared bus.

Proceeding with step 430, the dual-bus adapter can determine that the processor has requested a burst transfer operation. A burst transfer operation will be performed in lieu of a single word transfer operation. The dual-bus adapter can determine that the data words to be burst transferred will be sent to the processor via the direct bus. The dual-bus adapter can read data words from memory via the memory map interface and write those data words to the FIFO memory of the direct bus that is dedicated to transferring data words from the dual-bus adapter to the processor, e.g., the read FIFO memory.

In step 435, the dual-bus adapter can read a data word from memory via the memory map interface using the address information specified in the bus adapter control memory, e.g., using the bank address and the linear address. The dual-bus adapter can pass the specified address information to the memory map interface. The memory map interface can decode the received address information and retrieve the data word stored at the specified address. The memory map interface then passes the data word to the dual-bus adapter. In step 440, the dual-bus adapter can write the data word to the direct bus.

In step 445, the dual-bus adapter can increment the address, e.g., the portion of the address information specified by the linear address of the bus adapter control memory. In step 450, the dual-bus adapter can decrement the burst register, indicating one fewer data word to be burst transferred from the memory map interface to the processor. In step 455, the dual-bus adapter can determine whether any further data words remain to be processed according to whether the burst register stores a value that is greater than zero. When no further data words remain to be processed, the method can end. When additional data words remain to be processed, the method can loop back to step 435, where the dual-bus adapter can retrieve a next data word from memory via the memory map interface using the incremented address. The method can continue to iterate as described to complete the burst read operation.

The embodiments described within this specification provide systems and methods that facilitate burst transfer operations between a processor and a memory map interface. The system described can be implemented with fewer resources, and thus may be smaller, than a similar system that supports burst transfer operations on a shared bus. Further, efficient bursting of data is supported by sending signaling through the shared bus while sending the data words through the direct bus.

The flowcharts in the figures illustrate the architecture, functionality, and operation of possible implementations of circuits, systems, methods, and computer program products according to various embodiments of the present invention. In this regard, each block in the flowcharts may represent a module, segment, or portion of code, which comprises one or more portions of computer-usable program code that implements the specified logical function(s).

For example, the embodiments disclosed within this specification may be implemented as one or more intellectual property (IP) cores that may be available for use within a larger system. An IP core can include a predetermined set of configuration bits that program a programmable IC to perform one or more functions. Alternatively, an IP core can include source code or schematics that describe the logic and connectivity of a design. Some cores include an optimally floorplanned layout targeted to a specific family of programmable ICs. IP cores can also be parameterizable, i.e., allowing the user to enter parameters to activate or change certain core functionality.

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

Embodiments of the present invention can be realized in hardware, software, or a combination of hardware and software. Any kind of data processing system or other apparatus adapted for carrying out the methods described herein is suited. A typical combination of hardware and software can be a general-purpose computer system with a computer program that, when being loaded and executed, controls the computer system such that it carries out the methods described herein or is capable of instantiating a circuit design specified in programmatic form within an IC, whether programmable or not.

A "computer," e.g., a data processing system or a computer system, suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices such as, for example, keyboards, displays, pointing devices, etc., can be coupled to the computer either directly or through intervening I/O controllers. Network adapters may also be coupled to the computer to enable the computer to become coupled to other computers, devices, or remote printers or storage devices through intervening private or public networks. Modems, cable modems, and Ethernet cards are just a few of the currently available types of network adapters.

Embodiments of the present invention further can be embedded in a computer program product, which comprises all the features enabling the implementation of the methods described herein. The computer program product can include a computer-usable or computer-readable medium having computer-usable program code which, when loaded in a computer system, specifies, or causes the computer system to generate, a programmatic description of the circuits and/or systems described herein. Examples of computer-usable or computer-readable media can include, but are not limited to, optical media, magnetic media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library, a netlist, an IP core, a hardware description language specification of a system, a bitstream, and/or other sequence of instructions designed for execution on a computer system or which programs an IC, or implements within an IC, the embodiments described within this specification.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A system for communicating with a processor within an integrated circuit, the system comprising:
    a dual-bus adapter coupled to the processor through a first communication channel and a second communication channel, wherein the dual-bus adapter is further coupled to a memory map interface through which at least one peripheral device communicates with the processor,
    wherein single word operations are exchanged between the processor and the dual-bus adapter through the first communication channel,
    wherein each single data word specified by the single word operations is passed between the processor and the dual-bus adapter through the first communication channel; and
    wherein burst transfer operations are performed by exchanging signaling information between the processor and the dual-bus adapter over the first communication channel and exchanging data words between the processor and the dual-bus adapter through the second communication channel.

2. The system of claim 1, wherein responsive to detecting signaling information on the first communication channel, the dual-bus adapter determines whether a burst transfer operation has been initiated according to a value stored within a burst register.

3. The system of claim 2, wherein the signaling information specifies a single word operation to be performed via the first communication channel, wherein responsive to determining that a value greater than zero is stored within the burst register, the dual-bus adapter determines that a burst transfer operation is to be performed in lieu of the single word operation.

4. The system of claim 1, wherein the first communication channel is shared bus.

5. The system of claim 1, wherein the second communication channel is a direct bus forming a point-to-point connection.

6. The system of claim 5, wherein the second communication channel comprises:
    a write first-in-first out memory transferring data words from the processor to the dual-bus adapter; and
    a read first-in-first-out memory transferring data words from the dual-bus adapter to the processor.

7. The system of claim 6, wherein the dual-bus adapter iteratively reads a number of data words from the write first-in-first-out memory and writes the data words to a memory map interface, wherein the number of data words is determined according to a value stored in a burst register.

8. The system of claim 7, wherein the dual-bus adapter iteratively, until the value stored in the burst register indicates no further data words to be burst transferred, reads a data word from the write FIFO memory, writes the data word to an address in memory through the memory map interface, increments the address, and decrements the value stored in the burst register.

9. The system of claim 6, wherein the dual-bus adapter iteratively writes a number of data words from the memory map interface to the read first-in-first-out memory corresponding to the value stored in the burst register.

10. The system of claim 9, wherein the dual-bus adapter iteratively, until the value stored in the burst register indicates no further data words to be burst transferred, reads a data word at a selected memory address through the memory map interface, writes the data word to the read first-in-first-out memory, increments the address, and decrements the value stored in the burst register.

11. A method of communicating with a processor within an integrated circuit, the method comprising:
  exchanging, through a first communication channel, signaling information specifying a single word operation between a processor and a dual-bus adapter;
  responsive to the single word operation, determining whether a burst register indicates a burst transfer operation;
  in response to the burst register indicating no burst transfer operation to be performed, passing the single data word over the first communication channel; and
  in response to the burst register indicating that a burst transfer operation is to be performed, transferring data words of the burst transfer operation between the processor and the dual-bus adapter through a second communication channel.

12. The method of claim 11, further comprising selecting the first communication channel to be a shared bus.

13. The method of claim 12, further comprising selecting the second communication channel to be a direct bus forming a point-to-point connection.

14. The system of claim 11, wherein the second communication channel comprises a first-in-first-out memory that receives data words of a burst transfer operation from the processor, wherein the burst register indicates that a burst transfer operation is to be performed, the method further comprising, until the burst register indicates no further data words to be burst transferred:
  retrieving a data word from the first-in-first-out memory;
  writing the data word to an address in memory through a memory map interface;
  incrementing the address; and
  decrementing the value stored in the burst register.

15. The system of claim 11, wherein the second communication channel comprises a first-in-first-out memory that transmits data words of a burst transfer operation to the processor, wherein the burst register indicates that a burst transfer operation is to be performed, the method further comprising, until the burst register indicates no further data words to be burst transferred:
  reading a data word from an address in memory via the memory map interface;
  writing the data word to the first-in-first-out memory;
  incrementing the address to be read through the memory map interface; and
  decrementing the value stored in the burst register.

16. A computer program product comprising:
  a non-transitory computer-usable medium comprising computer-usable program code that implements a system for communicating with a processor within an integrated circuit, the non-transitory computer-usable medium comprising:
  computer-usable program code that implements a dual-bus adapter coupled to the processor through a first communication channel and a second communication channel, wherein the dual-bus adapter is further coupled to a memory map interface through which at least one peripheral device communicates with the processor,
  computer-usable program code that causes the dual-bus adapter to implement single word operations with the processor through the first communication channel and pass each single data word specified by the single word operations between the dual-bus adapter and the processor through the first communication channel, and
  computer-usable program code that causes the dual-bus adapter to perform a burst transfer operation by exchanging signaling information with the processor over the first communication channel and transferring data words between the processor and the dual-bus adapter through the second communication channel.

17. The computer program product of claim 16, wherein the signaling information specifies a single word operation to be performed via the first communication channel, wherein the computer-usable program code that implements a dual-bus adapter further comprises computer-usable program code that implements the dual-bus adapter to, responsive to determining that a value greater than zero is stored within the burst register, determine that a burst transfer operation is to be performed in lieu of the single word operation.

18. The computer program product of claim 16, wherein the non-transitory computer-usable medium further comprises computer-usable program code that implements the first communication channel as a shared bus.

19. The computer program product of claim 16, wherein the non-transitory computer-usable medium further comprises computer usable program code that implements the second communication channel as a direct interface forming a point-to-point connection comprising a write first-in-first out memory transferring data words from the processor to the dual-bus adapter and a read first-in-first-out memory transferring data words from the dual-bus adapter to the processor.

20. The computer program product of claim 17, wherein computer-usable program code that implements the dual-bus adapter further comprises computer-usable program code that causes the dual-bus adapter to iteratively transfer a number of data words between the processor and a memory map interface through the second communication channel, wherein the number of data words is determined according to a value stored in the burst register.

* * * * *